United States Patent
Yuen et al.

(10) Patent No.: US 10,230,877 B2
(45) Date of Patent: Mar. 12, 2019

(54) VEHICLE WITH MULTI-FOCAL CAMERA

(71) Applicant: GM GLOBAL TECHNOLOGY OPERATIONS LLC, Detroit, MI (US)

(72) Inventors: Ephraim C. Yuen, Markham (CA); Shiv G. Patel, Toronto (CA); Akram M. Abdel-Rahman, Ajax (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 221 days.

(21) Appl. No.: 15/333,981

(22) Filed: Oct. 25, 2016

(65) Prior Publication Data

US 2018/0115687 A1     Apr. 26, 2018

(51) Int. Cl.
| | |
|---|---|
| *H04N 5/225* | (2006.01) |
| *H04N 7/18* | (2006.01) |
| *H04N 5/232* | (2006.01) |
| *B60R 1/00* | (2006.01) |
| *G06K 9/00* | (2006.01) |

(52) U.S. Cl.
CPC .............. *H04N 5/2253* (2013.01); *B60R 1/00* (2013.01); *G06K 9/00791* (2013.01); *H04N 5/2252* (2013.01); *H04N 5/2254* (2013.01); *H04N 5/2257* (2013.01); *H04N 5/23203* (2013.01); *H04N 5/23293* (2013.01); *H04N 5/23296* (2013.01); *H04N 7/181* (2013.01); *H04N 7/183* (2013.01); *B60R 2300/202* (2013.01); *B60R 2300/50* (2013.01)

(58) Field of Classification Search
CPC .. H04N 5/2253; H04N 5/2252; H04N 5/2254; H04N 5/2257; H04N 5/23203; H04N 5/23293; H04N 5/23296; H04N 7/181; H04N 7/183; B60R 1/00; B60R 2300/202; B60R 2300/50; G06K 9/00791
USPC ............................................................ 348/148
See application file for complete search history.

(56) References Cited

U.S. PATENT DOCUMENTS

| | | | |
|---|---|---|---|
| 2006/0209434 A1* | 9/2006 | Baik ............... | G02B 7/102 359/819 |
| 2007/0279539 A1* | 12/2007 | Suzuki ............ | G06T 7/0018 348/135 |
| 2010/0002070 A1* | 1/2010 | Ahiska ............ | G08B 13/19691 348/36 |
| 2010/0277935 A1* | 11/2010 | Endo .............. | B60Q 1/0023 362/466 |
| 2014/0043473 A1* | 2/2014 | Gupta ............. | G06T 7/0018 348/135 |

(Continued)

*Primary Examiner* — Marnie A Matt
(74) *Attorney, Agent, or Firm* — Lorenz & Kopf, LLP (57) ABSTRACT

A vehicle includes a sensor unit, a body, a camera, a display, and a controller. The sensor unit obtains sensor data pertaining to conditions pertaining to the vehicle. The camera is mounted on the body, and includes a lens. The display is disposed within the body, and provides images from the camera. The controller is configured to at least facilitate rotating the lens, based at least in part on the one or more conditions, between a first position and a second position. When in the first position, the lens has a first focal length, resulting in images for the display with a first field of view. When in the second position, the lens has a second focal length that is shorter than the first focal length, resulting in images for the display with a second field of view that is wider than the first field of view.

20 Claims, 4 Drawing Sheets

(56) References Cited

U.S. PATENT DOCUMENTS

| | | | |
|---|---|---|---|
| 2014/0118549 A1* | 5/2014 | Meldrum | B60R 1/00 348/148 |
| 2016/0297362 A1* | 10/2016 | Tijerina | H04N 7/181 |
| 2018/0036879 A1* | 2/2018 | Buibas | B60R 1/00 348/148 |

* cited by examiner

VEHICLE WITH MULTI-FOCAL CAMERA

TECHNICAL FIELD

The technical field generally relates to the field of vehicles and, more specifically, to a vehicle with a multi-focal camera.

BACKGROUND

Many vehicles include a camera, such as a rear camera, for displaying an environment from behind the vehicle. Images from the camera can be displayed, for example, in a rear view mirror or a navigation system of the vehicle. However, images from such a camera may not always provide an optimized view of the environment behind the vehicle under all circumstances and conditions.

Accordingly, it is desirable to provide improved systems for vehicles that provide for improved images from a camera of a vehicle, such as a rear camera of the vehicle. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a system is provided. The system comprises a camera, a display, and a controller. The camera is configured to be mounted on a vehicle, the camera including a lens. The display is configured to be disposed within the vehicle, and to provide images from the camera. The controller is configured to be disposed within the vehicle, and is coupled to the camera. The controller is configured to at least facilitate rotating the lens, based at least in part on one or more conditions pertaining to the vehicle, between a first position and a second position. When in the first position, the lens has a first focal length, resulting in images for the display with a first field of view. When in the second position, the lens has a second focal length that is shorter than the first focal length, resulting in images for the display with a second field of view that is wider than the first field of view.

In accordance with another exemplary embodiment, a vehicle is provided. The vehicle comprises a sensor unit, a body, a camera, a display, and a controller. The sensor unit is configured to obtain sensor data pertaining to one or more conditions pertaining to the vehicle. The camera is mounted on the body, and includes a lens. The display is disposed within the body, and is configured to provide images from the camera. The controller is disposed within the vehicle, and is coupled to the camera. The controller is configured to at least facilitate rotating the lens, based at least in part on the one or more conditions, between a first position and a second position. When in the first position, the lens has a first focal length, resulting in images for the display with a first field of view. When in the second position, the lens has a second focal length that is shorter than the first focal length, resulting in images for the display with a second field of view that is wider than the first field of view.

In accordance with a further exemplary embodiment, a method is provided. The method comprises providing images on a display disposed inside a vehicle, from a camera mounted on the vehicle, determining one or more conditions pertaining to a vehicle via one or more sensors, and rotating a lens of a camera disposed on the vehicle, via instructions provided by a processor, based at least in part on the one or more conditions, between a first position and a second position. When in the first position, the lens has a first focal length, resulting in images for the display with a first field of view. When in the second position, the lens has a second focal length that is shorter than the first focal length, resulting in images for the display with a second field of view that is wider than the first field of view.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
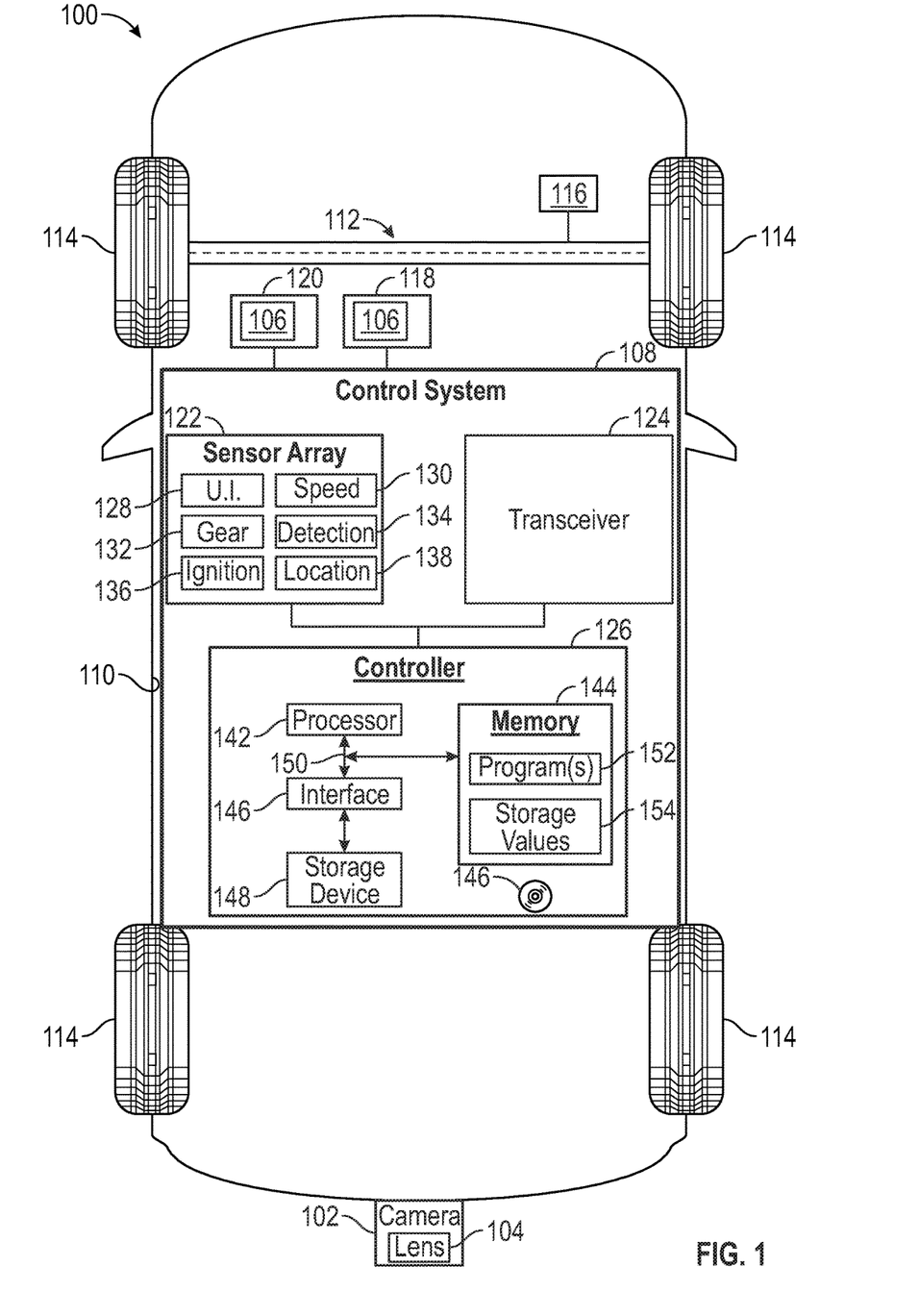
FIG. 1 is a functional block diagram of a vehicle that includes a camera with a rotatable lens, a display for providing images from the camera, and a control system for controlling the camera, in accordance with an exemplary embodiment.

FIG. 1 illustrates a vehicle 100, according to an exemplary embodiment. As described in greater detail further below, the vehicle 100 includes a rear-mounted camera 102 with an adjustable lens 104 for use in connection with one or more displays 106 inside the vehicle. The camera 102 is controlled via a control system 108, as depicted in FIG. 1. As described further below, in various situations the camera 102 provides images for use by the displays 106. The images have a varying field of view due to a varied focal length of the camera lens, due to adjustments in the adjustable lens 104 in response to user inputs and/or vehicle parameters, location, and/or surroundings, for example as discussed further below in connection with FIG. 1 as well as FIGS. 2-6.

The vehicle 100 preferably comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments.

The vehicle 100 includes a body 110 that is arranged on a chassis 112. The body 110 substantially encloses other components of the vehicle 100. The body 110 and the chassis 112 may jointly form a frame. The vehicle 100 also includes a plurality of wheels 114. The wheels 114 are each rotationally coupled to the chassis 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 is mounted on the chassis 112, and drives the wheels 114. The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the camera 102 is mounted on the vehicle 100. In the depicted embodiment, the camera 102 is mounted on a rear end of the vehicle, as shown in FIG. 1. The camera 102 provides images for viewing on one or more displays 106 that are disposed inside the vehicle 100 (i.e. inside the body 110 of the vehicle 100).

In one embodiment, the camera 102 provides images for viewing on a display 106 of a rear view mirror 118 of the vehicle 100. Also as depicted in FIG. 1, in one embodiment the camera 102 provides images for viewing on a display 106 of a navigation system 120 of the vehicle 100. In various embodiments, the display 106 may be provided on both the rear view mirror 118 and the navigation system 120, and/or on one or more other non-depicted displays 106 within the vehicle 100 (e.g., in a front instrument panel of the vehicle 100, in one or more side mirrors of the vehicle 100, or the like). In various embodiments, each display 106 comprises a video screen that is coupled to the camera 102. In one exemplary embodiment the display 106 comprises a liquid crystal display (LCD) screen or a light emitting diode (LED) screen. However, this may vary in other embodiments.

As depicted in FIG. 1 and noted above, the camera 102 includes a lens 104. The camera 102 provides different images, with different fields of view, based on rotation of the lens 104. Specifically, the lens 104 is rotatable between at least a first position and a second position. When in the first position, the lens has a first focal length, resulting in images for the display(s) 106 with a first field of view. When in the second position, the lens has a second focal length that is shorter than the first focal length, resulting in images for the display(s) 106 with a second field of view that is wider than the first field of view.

The control system 108 controls operation of the camera 102 and the displays 106. The control system 108 is disposed within the body 110 of the vehicle 100. In one embodiment, the control system 108 is mounted on the chassis 112. The control system 108 obtains information and data regarding vehicle 100 parameters, location, and environment, as well as inputs from a user (e.g. a driver of the vehicle 100), and utilizes this information and data for controlling the camera 102 and the displays 106, including adjustments of a focal length of the lens 104 of the camera 102 for images appearing on the displays 106. In various embodiments, the control system 108 provides these and other functions in accordance with steps of the process 600 described further below in connection with FIG. 6.

In the depicted embodiment, the control system 108 includes a sensor array 122, a transceiver 124, and a controller 126. The sensor array 122 includes various sensors (also referred to herein as sensor units and/or detection units) that are used for receiving inputs from a driver of the vehicle 100 and for monitoring certain parameters pertaining to the vehicle 100 and its components, location, and environment. In the depicted embodiment, the sensor array 122 includes one or more user interface sensors 128, speed sensors 130, transmission sensors 132, detection sensors 134, ignition sensors 136, and location sensors 138.

The user interface sensors 128 obtain inputs from one or more users of the vehicle (e.g. a driver of the vehicle), for example using one or more user interfaces. In various embodiments, the user interface sensors 128 obtain user inputs regarding a desired view for one or more displays 106, corresponding to a desired focal length of the lens 104 of the camera 102. In various embodiments, the user interface sensors 128 may obtain such inputs, and/or other user inputs, via a user's engagement of a touch screen of the vehicle (e.g. as part of the navigation system 120), a user's engagement of one or more knobs, bottoms, or other input devices of the vehicle 100, and/or a user's engagement of his or her smart phone and/or other electronic device, among various other possible input means.

The speed sensors 130 obtain values pertaining to one or more speeds of the vehicle 100. In one embodiment, the speed sensors 130 comprise wheel speed sensors that obtain speeds of one or more wheels 114 of the vehicle 100, for use (e.g. by the processor 142 below) in calculating a vehicle speed. In another embodiment, the speed sensors 130 may comprise and/or be part of an accelerometer for the vehicle 100, and/or one or more other types of sensors, systems, and/or devices for obtaining data for use in determining the vehicle speed.

The transmission sensors 132 obtain values pertaining to a transmission or gear of the vehicle 100. In certain embodiments, the transmission sensors 132 are part of or coupled to the drive system 116. Also in certain embodiments, the transmission sensors 132 detect a range or gear of the transmission, for example, whether the vehicle 100 is currently in park, drive, neutral, reverse, and/or one or more other gears and/or transmission states.

The detection sensors 134 sense the environment surrounding the vehicle 100, including roadways, road signs, road characteristics, parking space delineations, and other vehicles and other objects on the roadways, parking lots, or otherwise near the vehicle 100. In various embodiments, the detection sensors 134 include one or more cameras, radar, sonar, LIDAR, and/or other detection devices.

The ignition sensors 136 obtain data values pertaining to an ignition state of the vehicle 100. In certain embodiments, the ignition sensors 136 are part of or coupled to the drive system 116. Also in certain embodiments, the ignition sensors 136 detect whether an ignition of the vehicle 100 is turned on or off by the driver of the vehicle 100 (e.g. via keys, a stop/start button, a keyfob, or the like).

The location sensors 138 provide information pertaining to a current location of the vehicle 100. In certain embodiments, the location sensors 138 are part of a satellite-based location system, such as a global positioning system (GPS).

In various embodiments, the sensor array 122 provides the detected information and data to the controller 126 (e.g. the processor 142 thereof) for processing, for example as set forth in greater detail below. Also in various embodiments, the sensor array 122 performs these and other functions in accordance with the steps of the process 600 described further below in connection with FIG. 6.

The transceiver 124 transmits and/or receives one or more various information for use by the control system 108. In various embodiments, the transceiver 124 receives inputs from a user of the vehicle 100 (e.g. a driver of the vehicle 100), for example as to whether the user prefers a relatively wide view or a relatively narrow view for the images of the camera 102 for viewing on the displays 106. In certain embodiments, the transceiver 124 receives information pertaining to one or more vehicle parameters, such as transmission/gear status, vehicle speed, objection detection, and/or location of the vehicle 100, among other possible parameters (e.g. as may be transmitted via the sensor array, one or more other vehicle systems, and/or from outside the vehicle, such as from a satellite system, cellular network, vehicle to vehicle communications, infrastructure to vehicle communications, and so on). Also in certain embodiments, the transceiver 124 may also transmit instructions from the controller 126, for example to the camera 102 (or lens 104, or component thereof), the displays 106, and/or the sensor array 122.

The controller 126 utilizes the various inputs and data provided via the sensor array 122 and/or the transceiver 124, and provides instructions for adjustment of the focal length of the lens 104 of the camera 102, thereby changing the field of view for the images provided via the displays 106, based on conditions pertaining to the vehicle 100 (e.g. based on whether the vehicle 100 is being driven in a reverse gear, whether a speed of the vehicle 100 is greater than a predetermined threshold, whether the vehicle 100 is in a parking location (e.g. a parking lot), and whether a driver of the vehicle 100 has expressed a preference for a wide or narrow field of view for the camera 102 images appearing on the displays 106). In various embodiments, the controller 126, along with the sensor array 122, and the transceiver 124, provide these and other functions in accordance with the steps discussed further below in connection with the schematic drawings of the vehicle 100 in FIG. 1 and the flowchart pertaining to the process 600 in FIG. 6, discussed further below.

In one embodiment, the controller 126 is coupled to the camera 102, the displays 106, the sensor array 122, and the transceiver 124. Also in one embodiment, the controller 126 is disposed within the control system 108, within the vehicle 100. In certain embodiments, the controller 126 (and/or components thereof, such as the processor 142 and/or other components) may be part of the camera 102, disposed within the camera 102, and/or disposed proximate the camera 102. For example, in one embodiment, the lens 104 includes a controller 126 and/or processor 142 (e.g. as part of a "smart motor"). Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 102), among other possible variations.

As depicted in FIG. 1, the controller 126 comprises a computer system. In certain embodiments, the controller 126 may also include one or more of the sensors of the sensor array 122, the transceiver 124 and/or components thereof, the camera 102 and/or components thereof, one or more displays 106 and/or components thereof, and/or one or more other devices and/or systems and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the process 600 described further below in connection with FIG. 6.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154.

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data from the sensors of the sensor array 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the process 600 (and any sub-processes thereof) described further below in connection with FIG. 6. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
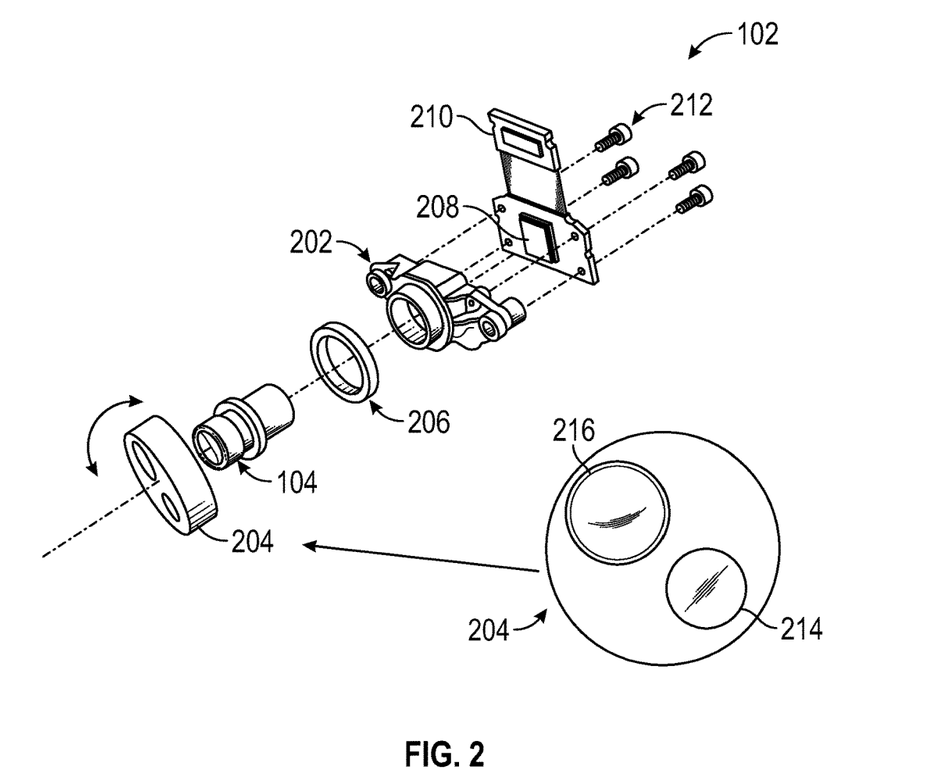
FIG. 2 is a schematic diagram of the camera of FIG. 1, shown in an exploded view, in accordance with an exemplary embodiment.
Figure 3:
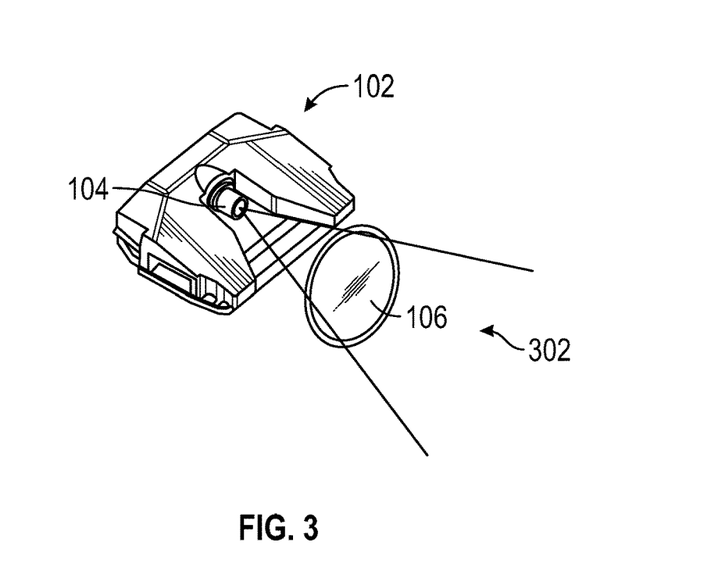
FIG. 3-5 are high level schematic diagrams illustrating adjustable fields of view resulting from an adjustable focal length of the lens of the camera of FIGS. 1 and 2, in accordance with an exemplary embodiment.
Figure 4:
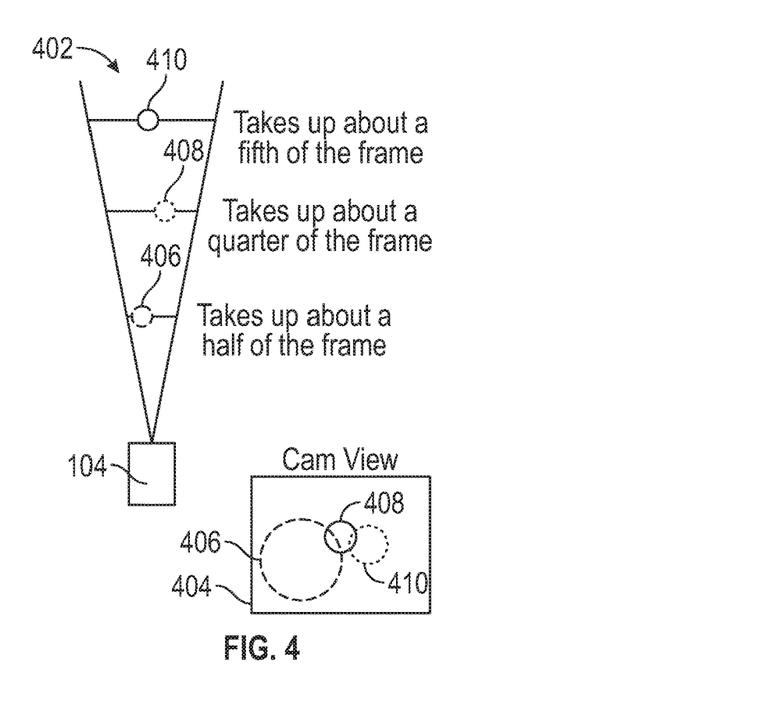
Figure 5:
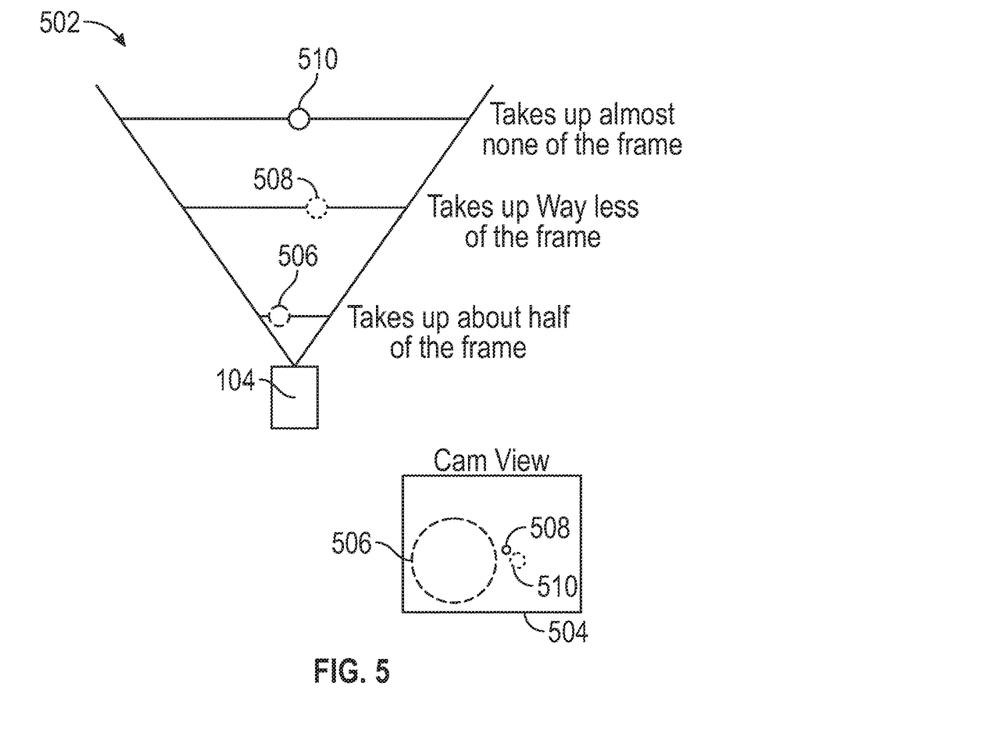

FIGS. 2-5 are schematic diagrams of the camera 102 of FIG. 1, in accordance with an exemplary embodiment. Specifically, FIG. 2 provides an exploded schematic view of various components of the camera 102, and FIGS. 3-5 provide high level schematic views showing adjustable fields of view 302, 402, and 502 resulting from an adjustable focal length of the lens 104 of the camera 102, in accordance with an exemplary embodiment.

As depicted in FIG. 2, the camera 102 includes the above-mentioned lens 104 from FIG. 1, as well as a lens mount 202, an actuator mechanism 204, a gasket 206, an image sensor 208, a connector 210, and fasteners 212. It will be appreciated that certain components may vary in other embodiments.

In the depicted embodiments, the actuator mechanism 204 is coupled to the lens 104. In one embodiment, the actuator mechanism 204 is attached to both the lens 104 and the lens mount 202, with the gasket 206 in between for fitting. The actuator mechanism 204 is configured to adjust a focal length of the lens 104. With reference to FIG. 3, an example of an adjustable field of view 302 is depicted, resulting from the adjustable focal length of the lens 104. Different adjustable fields of view 402, 502 are also depicted in FIGS. 4 and 5, and are discussed further below in connection therewith.

With reference again to FIG. 2, in various embodiments, the actuator mechanism is configured to rotate the lens 104 between two different positions, to adjust a focal length of the lens 104. When the lens 104 is in a first position 214, the lens 104 has a relatively longer focal length, thereby resulting in a relatively narrower field of view 302. Conversely, when the lens 104 is in a second position 216, the lens 104 has a relatively shorter focal length, thereby resulting in a relatively wider field of view 302.

In various embodiments, the first position 214 may provide relatively clearer images of objects that are relatively farther away from the vehicle 100, while having a relatively narrower view of objects on either side (e.g. the driver's side and the passenger's side) behind the vehicle 100 (e.g. which may be advantageous when driving on a highway). Conversely, the second position 216 may provide relatively less clear images of objects that are relatively farther away from the vehicle 100, while having a relatively broader view of objects on either side (e.g. the driver's side and the passenger's side) behind the vehicle 100 (e.g. which may be advantageous when driving the vehicle 100 in a parking lot).

In one embodiment, the first position 214 results in a field of view that is between forty (40) and eighty (80) degrees. Also in one embodiment, the second position 216 results in a field of view that is between one hundred and sixty (160) and one hundred and eighty (180) degrees. The exact fields of view may vary in other embodiments.

With reference to FIG. 4, an exemplary first field of view 402 and resulting first display image 404 (as would appear on one or more displays 106 of FIG. 1) are depicted, both corresponding to the lens 104 being in the first position 214 of FIG. 2, in accordance with an exemplary embodiment. As depicted in FIG. 4, the first field of view 402 is relatively narrow (e.g. as compared with the second field of view 502, described further below in connection with FIG. 5). In various embodiments, as discussed above, the first field of view 402 is between forty (40) and eighty (80) degrees.

Also depicted in FIG. 4 with respect to the first field of view 402 and the first display image 404 are three objects behind the vehicle 100, namely, a first object 406, a second object 408, and a third object 410. In one embodiment, as between the three objects 406, 408, and 410, (i) the first object 406 is relatively closest to the vehicle 100, (ii) the third object 410 is relatively farthest from the vehicle 100, and (iii) the second object 408 is closer to the vehicle 100 than the third object 410 but farther from the vehicle 100 than the first object 406.

In the example of FIG. 4, when the lens 104 is in the first position 214 of FIG. 2, the first object 406 takes up approximately fifty percent (50%) of the display screen. The second object 408 takes up approximately twenty five percent (25%) of the display screen. Finally, the third object 408 takes up approximately twenty percent (20%) of the display screen.

With reference to FIG. 5, an exemplary second field of view 502 and resulting second display image 504 (as would appear on one or more displays 106 of FIG. 1) are depicted, both corresponding to the lens 104 being in the second position 216 of FIG. 2, in accordance with an exemplary embodiment. As depicted in FIG. 5, the second field of view 502 is relatively wide (e.g. as compared with the first field of view 402 described above in connection with FIG. 4). In various embodiments, as discussed above, the second field of view 502 is between one hundred and sixty (160) and one hundred and eighty (180) degrees.

Also depicted in FIG. 5 with respect to the second field of view 502 and the second display image 504 are three objects behind the vehicle 100, namely, a first object 506, a second object 508, and a third object 510. In one embodiment, the first, second, and third objects 506, 508, and 510 of FIG. 5 correspond to the first, second, and third objects 406, 408, and 410, respectively, of FIG. 4, but appear differently in the second field of view 502 and the second display image 504 of FIG. 5 due to the relatively shorter focal length of the second position 216 of FIG. 2.

In one embodiment, because the second field of view 502 of FIG. 5 is wider than the first field of view 402 of FIG. 4, the objects that are relatively farther from the vehicle (e.g. the second and third objects 508 and 510) take up much less of the display screen. For example, in the embodiment depicted in FIG. 5, when the lens 104 is in the second position 216 of FIG. 2, the first object 506 still takes up approximately fifty percent (50%) of the display screen. However, the second object 508 takes up much less than twenty five percent (25%) of the display screen, and the third object 508 takes up much less than twenty percent (20%) of the display screen.

Returning to FIG. 2, the image sensor 208 captures the images for the camera 102. In one embodiment, the image sensor 208 is connected to the lens mount 202. Also as depicted in FIG. 2, a connector 210 and fasteners 212 are utilized to mount the camera 102 to the body 110 of the vehicle 100, and particularly to the rear end of the body 110 as depicted in FIG. 1. In the depicted embodiment, four M2 fasteners 212 are utilized. However, the number and/or type of fasteners 212 may vary in other embodiments.

Figure 6:
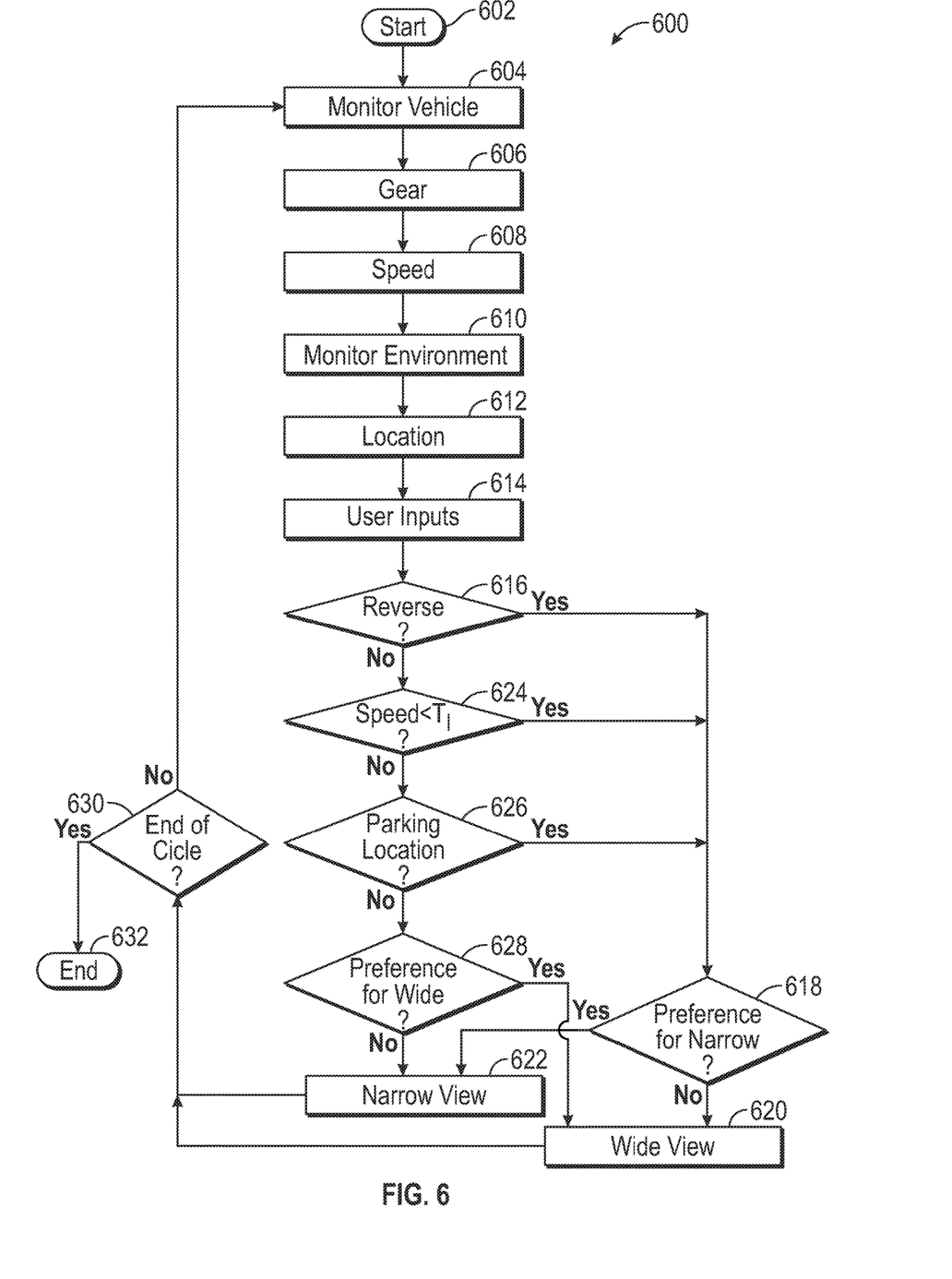
FIG. 6 is a flowchart of a process for controlling a multi-focal camera for a vehicle, and that can be implemented in connection with the camera of FIGS. 1-5 and the vehicle, display, and control system of FIG. 1, in accordance with an exemplary embodiment.

With reference to FIG. 6, a flowchart is provided for a process 600 for controlling a multi-focal camera for a vehicle, in accordance with an exemplary embodiment. The process 600 can be implemented in in connection with the camera 102 and lens 104 of FIGS. 1-5, and in connection with the vehicle 100, the displays 106, and the control system 108 of FIG. 1, in accordance with an exemplary embodiment.

As depicted in FIG. 6, the process begins at 602. In one embodiment, the process begins when a vehicle drive or ignition cycle begins, for example when a driver approaches or enters the vehicle, or when the driver turns on the vehicle and/or an ignition therefor (e.g. by turning a key, engaging a keyfob or start button, and so on). In one embodiment, the steps of the process 600 are performed continuously during operation of the vehicle.

Vehicle parameters are monitored (step 604). In one embodiment, various different parameters pertaining to vehicle states, operation of the vehicle, a location of the vehicle, an environment surrounding the vehicle, and inputs from a user of the vehicle (e.g. a driver of the vehicle) are monitored. Also in one embodiment, the vehicle parameters are monitored via the sensor array 122 and/or transceiver 124 of FIG. 1, and are provided to the processor 142 of the controller 126 of FIG. 1 for processing.

A transmission range or gear is obtained (step 606). In various embodiments, a transmission range or gear (e.g. park, drive, neutral, or reverse) is determined via the processor 142 of FIG. 1 based on information provided via the sensor array 122, particularly one or more transmission sensors 132 thereof, of FIG. 1. In certain embodiments, the sensor array 122 may itself determine the transmission range or gear, and/or the transceiver 124 of FIG. 1 may provide the transmission range or gear based on detection and/or determinations by one or more onboard or off-vehicle sensors and/or systems.

A vehicle speed is also obtained (step 608). In various embodiments, the vehicle speed is determined via the processor 142 of FIG. 1 based on information provided via the sensor array 122, particularly the speed sensors 130 (e.g. wheel speed sensors) of FIG. 1. In certain embodiments, the sensor array 122 may itself determine the vehicle speed, and/or the transceiver 124 of FIG. 1 may provide the vehicle speed based on detection and/or determinations by one or more onboard or off-vehicle sensors and/or systems (e.g. via a satellite location system).

An environment surrounding the vehicle is monitored (step 610). In various embodiments, the vehicle environment is monitored by the processor 142 of FIG. 1 based on information provided via the sensor array 122, particularly the detection sensors 134 (e.g. cameras, radar, LIDAR, sonar, and so on). In certain embodiments, the sensor array 122 may itself monitor the environment, and/or the transceiver 124 of FIG. 1 may also obtain information for monitoring the environment surrounding the vehicle 100 (e.g. from vehicle to vehicle or infrastructure to vehicle communications).

A location of the vehicle is determined (step 612). In various embodiments, the vehicle location is determined using the processor 142 and/or the sensor array 122, particularly the location sensors 138, for example using one or more location systems such as a satellite-based global positioning system (GPS), or the like. In certain embodiments, the transceiver 124 may be used for retrieving such GPS and/or other location data.

User inputs are obtained (step 614). In various embodiments, user inputs are obtained as to a preference for a user (e.g. a driver of the vehicle 100) for a relatively wide or a relatively narrow field of view for the camera images as provided via the displays 106 of FIG. 1. In certain embodiments, the user inputs are obtained via the user interface sensors 128 of FIG. 1 coupled to a user interface (e.g. a knob, button, touch screen display, or the like) inside the vehicle, and are provided to the processor 142 of FIG. 1 for processing. In certain other embodiments, the user inputs are obtained via the transceiver 124 of FIG. 1 (e.g. if provided via electronic transmission from the user's keyfob, mobile phone, or other electronic device) and provided to the processor 142 of FIG. 1 for processing.

A determination is made as to whether the vehicle is in a reverse transmission range (step 616). In one embodiment, this determination is made by the processor 142 of FIG. 1 based on the data obtained in step 606 (e.g. via the transmission sensors 132 of FIG. 1).

If it is determined in step 616 that the vehicle is in a reverse transmission range, then the lens 104 of the camera 102 will be adjusted to provide a relatively wide field of view, provided that the user has not provided instructions to the contrary (for example as explained below in connection with steps 618-622). Specifically, in accordance with one embodiment, when the vehicle is in a reverse transmission range, a determination is made as to whether the user has provided a preference for a narrow field of view (step 618). In one embodiment, this determination is made by the processor 142 of FIG. 1 based on the data obtained in step 614 (e.g. from the user interface sensors 128 of FIG. 1).

If it is determined in step 618 that the user has not provided a preference for a narrow field of view, then the lens 104 of the camera 102 is adjusted to provide a relatively wide field of view (step 620). Specifically, in accordance with one embodiment, the processor 142 of FIG. 1 provides instructions to the actuator mechanism 204 of FIG. 2 to rotate the lens 104 of the camera 102 to the second position 216 of FIG. 2, to thereby result in relatively shorter focal length and relatively wider second field of view 502 and the second display image 504 of FIG. 5. The relatively wider field of view is provided on one or more displays 106 of FIG. 1 accordingly via instructions provided by the processor 142. The relatively wider field of view provides the driver with a more comprehensive view of other vehicles and objects in close proximity behind the vehicle 100 (e.g. providing a potentially better short-distance view).

Conversely, if it is determined in step 618 that the user has provided a preference for a narrow field of view, then the lens 104 of the camera 102 is adjusted instead to provide a relatively narrow field of view (step 622). Specifically, in accordance with one embodiment, the processor 142 of FIG. 1 provides instructions to the actuator mechanism 204 of FIG. 2 to rotate the lens 104 of the camera 102 to the first position 214 of FIG. 2, to thereby result in relatively longer focal length and relatively narrower first field of view 402 and the first display image 404 of FIG. 4. The relatively narrower field of view is provided on one or more displays 106 of FIG. 1 accordingly via instructions provided by the processor 142. The relatively narrower field of view provides the driver with a relatively clearer view of other vehicles and objects in relatively distant proximity behind the vehicle 100 (e.g. providing a potentially better long-distance view).

With reference again to step 616, if it is determined that the vehicle is not in a reverse transmission range, then a determination is made as to whether a speed of the vehicle is less than a predetermined threshold (step 624). In one embodiment, this determination is made by the processor 142 of FIG. 1 based on the data obtained in step 608 (e.g. via the speed sensors 130 of FIG. 1). In one embodiment, the predetermined threshold is equal to ten miles per hour; however, this may vary in other embodiments.

If it is determined in step 624 that the vehicle speed is less than the predetermined threshold, the lens 104 of the camera 102 will be adjusted to provide a relatively wide field of view, provided that the user has not provided instructions to the contrary. Specifically, in accordance with one embodiment, when the vehicle speed is less than the predetermined threshold, the process returns to the above-referenced step 618, in which a determination is made as to whether the user has provided a preference for a narrow field of view. If the user has not provided such a preference for a narrow field of view, then the process proceeds to the above-discussed step 620, as the wide field of view is provided. Conversely, if the user has provided such a preference for a narrow field of view, then the process proceeds instead to the above-discussed step 622, as the narrow field of view is provided.

With reference again to step 624, if it is determined that the vehicle speed is greater than or equal to the predetermined threshold, then a determination is made as to whether the vehicle is currently located (or is currently being driven) in a parking location, such as a parking lot (step 626). In one embodiment, this determination is made by the processor 142 of FIG. 1 based on the data obtained in step 612 (e.g. via the location sensors 138 of FIG. 1).

If it is determined in step 626 that the vehicle speed is in a parking location (e.g. that the vehicle is currently being operated in a parking lot), the lens 104 of the camera 102 will be adjusted to provide a relatively wide field of view, provided that the user has not provided instructions to the contrary. Specifically, in accordance with one embodiment, when the vehicle is disposed in a parking location, the process returns to the above-referenced step 618, in which a determination is made as to whether the user has provided a preference for a narrow field of view. If the user has not provided such a preference for a narrow field of view, then the process proceeds to the above-discussed step 620, as the wide field of view is provided. Conversely, if the user has provided such a preference for a narrow field of view, then the process proceeds instead to the above-discussed step 622, as the narrow field of view is provided.

With reference again to step 626, if it is determined that the vehicle is not in a parking location, then a determination is made as to whether the user has provided a preference for a wide field of view (step 628). In one embodiment, this determination is made by the processor 142 of FIG. 1 based on the data obtained in step 614 (e.g. from the user interface sensors 128 of FIG. 1. If the user has provided a preference for a wide field of view, then the process proceeds to the above-discussed step 620, as the wide field of view is provided. Conversely, if the user has not provided such a preference for a wide field of view, then the process proceeds instead to the above-discussed step 622, as the narrow field of view is provided.

In one embodiment, as part of (or following) steps 620 or 622, a determination is made as to whether an end of the current vehicle drive cycle (e.g. ignition cycle) is present (step 630). In one embodiment, this determination is made by the processor 142 of FIG. 1 based on data from the ignition sensors 136 of FIG. 1 (e.g. after the driver has turned the keys of the ignition to an off position, pressed or engaged a stop button or knob, engaged a keyfob, touch screen, or the like). If it is determined that the end of the current vehicle drive cycle is present, then the process terminates (step 632). Otherwise, the process repeats beginning with step 604, as depicted in FIG. 6.

Accordingly, the process 600 provides a relatively wider field of view (resulting from a relatively shorter focal length for the camera lens) when the vehicle is in a slow moving and/or parking situation, such as when the vehicle is in reverse, the vehicle speed is relatively low, and/or the vehicle is in a parking location, provided that the driver has not opted out of such a view with a request for a narrow view. The relatively wide view potentially provides the driver with greater visibility of other vehicles and objects in close proximity behind the vehicle. In some embodiments, the wide view may be provided automatically without any check for driver preferences, among other possible variations.

Conversely, the process 600 provides a relatively narrow field of view (resulting from a relatively longer focal length for the camera lens) when the vehicle is moving fast in a non-parking context, for example on a highway, provided that the driver has not opted out of such a view with a request for a wide view. The relatively narrow view potentially provides the driver with greater visibility of other vehicles and objects in distant proximity behind the vehicle. In some embodiments, the narrow view may be provided automatically without any check for driver preferences, among other possible variations. By way of additional example, the steps of the process 600 may continuously repeat regardless of any determination in step 630, and so on.

Accordingly, the systems, vehicles, and methods described herein provide for the utilization of a multi-focal camera, for example in the rear of the vehicle. Depending upon the circumstances of the vehicle and/or the environment, and/or the preferences of the user, the lens of the camera is adjusted to adjust the focal length, and thereby adjust the field of view, of the camera. This provides for a potentially improved experience for the user, while only using a single rear camera.

It will be appreciated that the systems, vehicles, and methods may vary from those depicted in the Figures and described herein. For example, the vehicle 100, the camera 102, the displays 106, the control system 108, and/or various components thereof may vary from that depicted in FIGS. 1-5 and described in connection therewith, in various embodiments. It will similarly be appreciated that the steps of the process 600 may differ from those depicted in FIG. 6, and/or that various steps of the process 600 may occur concurrently and/or in a different order than that depicted in FIG. 6, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system comprising:
   a camera configured to be mounted on an automobile, the camera including a single lens;
   a display configured to be disposed within the automobile, and to provide images from the camera; and
   a controller configured to be disposed within the automobile, the controller coupled to the camera, the controller configured to at least facilitate rotating the single lens, based at least in part on one or more conditions pertaining to the automobile, between:
   a first position, in which the single lens has a first focal length, resulting in images for the display with a first field of view; and
   a second position, in which the single lens has a second focal length that is shorter than the first focal length, resulting in images for the display with a second field of view that is wider than the first field of view.

2. The system of claim 1, wherein the camera is configured to be mounted on a rear end of the automobile.

3. The system of claim 1, wherein the camera further comprises an actuator configured to rotate the single lens between the first and second positions.

4. The system of claim 3, wherein the controller comprises a processor configured to provide instructions to the actuator to maintain the single lens in the second position based on whether the automobile is being driven in a reverse gear.

5. The system of claim 3, wherein the controller comprises a processor configured to provide instructions to the actuator to maintain the single lens in the second position based on whether a speed of the automobile exceeds a predetermined threshold.

6. The system of claim 3, wherein the controller comprises a processor configured to provide instructions to the actuator to maintain the single lens in the second position based on whether the automobile is being driven in a parking lot.

7. The system of claim 3, wherein the controller comprises a processor configured to provide instructions to the actuator to maintain the single lens in the second position based on whether a driver of the automobile has expressed a preference for the second field of view.

8. An automobile comprising:
   a sensor unit configured to obtain sensor data pertaining to one or more conditions pertaining to the automobile;
   a body;
   a camera mounted on the body, the camera including a single lens;
   a display disposed within the body, the display configured to provide images from the camera; and
   a controller disposed within the automobile, the controller coupled to the camera, the controller configured to at least facilitate rotating the single lens, based at least in part on the one or more conditions, between:
   a first position, in which the single lens has a first focal length, resulting in images for the display with a first field of view; and
   a second position, in which the single lens has a second focal length that is shorter than the first focal length, resulting in images for the display with a second field of view that is wider than the first field of view.

9. The automobile of claim 8, wherein the camera is configured to be mounted on a rear end of the automobile.

10. The automobile of claim 8, wherein the camera further comprises an actuator configured to rotate the single lens between the first and second positions.

11. The automobile of claim 10, wherein the controller comprises a processor configured to provide instructions to the actuator to maintain the single lens in the second position based on whether the automobile is being driven in a reverse gear.

12. The automobile of claim 10, wherein the controller comprises a processor configured to provide instructions to the actuator to maintain the single lens in the second position based on whether a speed of the automobile exceeds a predetermined threshold.

13. The automobile of claim 10, wherein the controller comprises a processor configured to provide instructions to the actuator to maintain the single lens in the second position based on whether the automobile is being driven in a parking lot.

14. The automobile of claim 10, wherein the controller comprises a processor configured to provide instructions to the actuator to maintain the single lens in the second position based on whether a driver of the automobile has expressed a preference for the second field of view.

15. A method comprising:
    providing images on a display disposed inside a automobile, from a camera mounted on the automobile;
    determining one or more conditions pertaining to the automobile via one or more sensors; and
    rotating a single lens of the camera, via instructions provided by a processor, based at least in part on the one or more conditions, between:
    a first position, in which the single lens has a first focal length, resulting in images for the display with a first field of view; and
    a second position, in which the single lens has a second focal length that is shorter than the first focal length, resulting in images for the display with a second field of view that is wider than the first field of view.

16. The method of claim 15, wherein:
    the camera is mounted on a rear end of the automobile and includes an actuator; and
    the processor is configured to provide instructions to the actuator to rotate the single lens between the first and second positions based at least in part on the one or more conditions.

17. The method of claim 16, wherein the processor is configured to provide instructions to the actuator to maintain the single lens in the second position based on whether the automobile is being driven in a reverse gear.

18. The method of claim 16, wherein the processor is configured to provide instructions to the actuator to maintain the single lens in the second position based on whether a speed of the automobile exceeds a predetermined threshold.

19. The method of claim 16, wherein the processor is configured to provide instructions to the actuator to maintain the single lens in the second position based on whether the automobile is being driven in a parking lot.

20. The method of claim 16, wherein the processor is configured to provide instructions to the actuator to maintain the single lens in the second position based on whether a driver of the automobile has expressed a preference for the second field of view.

\* \* \* \* \*